United States Patent [19]

Blaschke

[11] Patent Number: 4,689,732

[45] Date of Patent: Aug. 25, 1987

[54] METHOD AND APPARATUS TO OPERATE AN INTERMEDIATE CIRCUIT CONVERTER WITH CURRENT RISE LIMITATION

[75] Inventor: Felix Blaschke, Erlangen, Fed. Rep. of Germany

[73] Assignee: Siemens Aktiengesellschaft, Berlin and Munich, Fed. Rep. of Germany

[21] Appl. No.: 759,139

[22] Filed: Jul. 26, 1985

[30] Foreign Application Priority Data

Jul. 27, 1984 [DE] Fed. Rep. of Germany ....... 3427841

[51] Int. Cl.$^4$ .......................... H02P 5/40; H02J 3/36
[52] U.S. Cl. ...................................... 363/35; 363/51; 318/800
[58] Field of Search .................. 363/34–37, 363/51; 318/800–803

[56] References Cited

U.S. PATENT DOCUMENTS

| | | | |
|---|---|---|---|
| 3,805,135 | 4/1974 | Blaschke | 318/227 |
| 3,824,437 | 7/1974 | Blaschke | 318/803 |
| 3,939,387 | 2/1976 | Maeda | 363/34 X |
| 4,230,979 | 10/1980 | Espelage et al. | 318/803 X |
| 4,282,473 | 8/1981 | Dreiseitl et al. | 318/803 |
| 4,338,559 | 7/1982 | Blaschke et al. | 318/803 X |
| 4,379,325 | 4/1983 | Krampe et al. | 363/35 |
| 4,388,577 | 6/1983 | Blaschke et al. | 318/803 X |
| 4,423,367 | 12/1983 | Blaschke et al. | 318/803 |
| 4,441,065 | 4/1984 | Bayer et al. | 318/803 X |
| 4,475,074 | 10/1984 | Reng | 318/800 |
| 4,486,698 | 12/1984 | Blümner | 318/803 X |

Primary Examiner—Patrick R. Salce
Assistant Examiner—Emanuel Todd Voeltz
Attorney, Agent, or Firm—Mark H. Jay

[57] ABSTRACT

To assure the commutatibility of an intermediate circuit converter with an impressed intermediate circuit d.c. current it is sufficient to limit the rate of rise of the intermediate circuit current under operating conditions to the product f*. i* from the current and frequency of the converter. A rate of rise limited in such a fashion to a maximum value reflecting operating conditions can be preset to a rate of change limiter using a rate of rise limiting controller to which the preset maximum value as well as the rate of rise of the control value for the intermediate circuit current itself has been preset. For that purpose a current controller, whose output signal are connected to suitable control values, assures an immediate control of the intermediate circuit current to the current reference value which has been limited in its rate of rise.

17 Claims, 4 Drawing Figures

METHOD AND APPARATUS TO OPERATE AN INTERMEDIATE CIRCUIT CONVERTER WITH CURRENT RISE LIMITATION

BACKGROUND OF THE INVENTION

This invention relates to the field of electrical power conversion systems, more particulary to a method for operating an indirect frequency converter with an impressed intermediate circuit current for which a sliding control value is preset. The invention further relates to an associated apparatus to implement the method within the converter.

A "sliding control value" is a control value which is variable only by a finite rate of rise. Thus, if a command (desired value, controller output etc.) which is subject to sudden variations particularly for either the intermediate circuit d.c. current or the amplitude of the output a.c. current of a indirect frequency converter, then from this suddenly changeable value, e.g., in a rate of change limiter, a control value for this current is generated. This current reference value increases only smoothly, that is, with a maximum "sliding rate" (rate of acceleration) predetermined by the rate of rise of the rate of change limiter, to a new value varied by the extent of the reference variable sudden variation. If the actual current is strictly adjusted to said sliding control value, e.g. by a closed loop control, the actual current also is a "sliding current".

A type of indirect frequency converter with a variable set value input is described in German patent application No. 2,144,422 (U.S. Pat. No. 3,805,135). It consists of an amplifier stage driven by a command (current control value) followed by an integrator. The integrator output signal with a constantly adjusted amplification factor, is fed back into the amplifier stage to determine the amplfication factor thereof. The integrator output signal then represents a sliding control value, while the integrator input signal, conversely, represents the rate of rise of the control value.

In this previous patent application, a respective current control value controls each of the stator current vector orthogonal components in an induction machine, with a series vector analyzer determining the magnitude of the current control vector adjusted by the control values, as well as the direction of this vector. The magnitude is supplied to a current regulator to regulate the intermediate circuit current which regulates the input-side rectifier of the indirect frequency converter, while utilizing the current direction by means of a phase regulating circuit, the direction (i.e., frequency and phase) of the stator current vector is regulated properly into a phase-regulating circuit working on the machine-side inverter. The vector analyzer is therein a special case of a Cartesian/polar working component converter which determines the magnitude and direction of the polar vector from the Cartesian components of the vector. Generally, vector analyzers provide the direction in the form of the Cartesian components of the corresponding unit vector, while the "C-p converters" indicate the direction using a single angle signal.

The design specifies that the control values for both current components are preset in accordance with desired values for the field-parallel and field-normal components of the stator current so that the torque and current can be controlled or regulated independent of each other.

However, in a converter with a d.c. intermediate circuit the intermediate circuit current i can only be increased from one commutation time point (T) to the next commutation time point (T+ΔT) by a certain factor C if reliable commutation is to be assured, i.e., between currents i(T) and i(T+ΔT) at both commutation time points the equation $$i(T+\Delta T) \leq i(T) + C \cdot i(T)$$

must be met, i.e., for the rate of rise of the current, the following should apply:

$$di(T)/dt = (i(T+\Delta T) - i(T))/\Delta T \leq C \cdot i(T)/\Delta T.$$

Accordingly the current rise rate has to be limited considering on the one hand the lowest actual current i possible, and on the other hand considering the largest actual duration ΔT (i.e., the lowest frequency). This then means that in controlling or regulating the intermediate circuit current, the rate of rise of the intermediate circuit current must be limited to a maximum value. The converter thus can not be run up suddenly to a higher capacity. This means that in operating conditions in which there are both higher frequencies as well as higher currents, the actually maximum permissible rate of current rise is excluded by the current rise limitation so that, for example, in the above mentioned patent application certain sudden load variations in the induction machine cannot be adequately controlled by fast adjusting the current reference values.

In the above-described field-oriented control of the induction machine it seems initially sufficient to determine using a vector analyzer or C/p converter, only that amount of that vector whose Cartesian components are defined by both control values and to restrict the rate of rise of this controlling vector magnitude. As, however, the vector magnitude depends on both orthogonal components, said rise limitation acting upon the magnitude regulation would mean that, for example, given a sudden variation in the reference variable for the field normal stator component (e.g., active current), the field-parallel component (e.g., magnetizing current) would also be changed until the increasing reference value has obtained the new desired operating status. Thus, the desired separate influence of the active and reactive current would be eliminated.

For that reason the known device in accordance with the patent document is designed so that in the control circuit for the magnitude there are no rate of increase elements for purposes of restricting the current rise. Rather, the current rise limitation takes place during the generation of the sliding control values for both current components, and the magnitude of the sliding current control vector defined by the sliding control values serves as the command (control value) for control of the intermediate circuit current.

The output current of the frequency converter is now controlled in such a fashion based upon said sliding current control vector that on the one hand a magnitude controller controls the magnitude of the intermediate circuit current or the amplitude of the output current in line with the magnitude of the sliding current control vector and so that a variable corresponding to the current rise of the magnitude reference value is connected as a precontrol voltage to the output signal of the magnitude controller. The intermediate circuit reactance coil of the frequency converter corresponds, in a closed loop control structure, to an integration element with the driving voltage as the input variable and the current as the output variable, i.e., the derivative with respect to time of the intermediate circuit current is proportional to the driving voltage across the intermediate circuit reactance coil ("voltage drop"), and connecting a corresponding precontrol value necessitates that a d.c. current corresponding to the respective intermediate circuit current reference value builds up immediately and is maintained in stationary operation by the action of the current controller.

The design also foresees connecting an additional precontrol value to the output of the magnitude controller which is proportional to the voltage arising at the inverter-side connection of the intermediate circuit reactance coil so that the voltage arising at the rectifier-side connection of the reactance coil follows along with the inverter input voltage. This corresponds to a decoupling of the current component connected in series to the intermediate circuit reactance coil so that the coil becomes in essence a functioning non-reactive integrator. The reactance coil current can then be non-reactively impressed exclusively by the output signal of the current magnitude controller. This second precontrol value is not obtained as a measured value at the reactance coil, however, but computed from suitable reference variables so that in place of using harmonic-laden actual values, practically harmonic-free substitute actual values are utilized. The intermediate circuit current control circuit thus acts almost without any delay on the amplitude of the output current, while the phase and frequency of the output current are preset by the fact that the direction of the stator current vector follows along with the direction of the sliding current control vector by a direction regulator influencing on the inverter frequency.

In this known embodiment therefore it can be seen that on the one hand the rate of rise of the intermediate circuit current is limited by presetting the variable reference value and, on the other hand, this rate of rise limitation does not interfere with the decoupled setting of the active current and the magnetizing current.

It is an object of this invention is to attain the most rapid possible magnitude change of the stator current vector while still retaining its commutation capability, which is not attained by the known device. This objective is attained by having the rate of rise of the sliding current control value instead of being a preset constant as in the known device, be a dynamically set or adjusted value in accordance with the operating conditions. Therefore, the sliding rate of the sliding intermediate current or the corresponding sliding control value is given by a function of parameters (actual values, desired values or control values) representing the instantaneous state of operation. To the extent that electrical operating variables are required for that purpose, the maximum value of the current rate or rise permissible at any given time for the actual operating conditions will, preferably, be determinde always based upon the control variables and desired values of the electrical operating variables generated in the converter control itself. This maximum value is then inputted as the rate of rise of the current reference value.

For better understanding, also another notation is used in the specification for identifying the different values appearing during controlled operation;

The impressed actual intermediate current, which is made sliding with the limited rate of rise, is shortly called "intermediate current" i. A superposed, load dependent operation—not part of the invention—generates "reference variables" as "Control values", subjected to abrupt changes according to the actual load conditions. For the undisturbed converter operation, the corresponding "Current control value" i** ("current reference variable") is transferred by some kind of limiting process in a "sliding current control value" i*, which is used, e.g. as desired value or reference input signal of a second order closed loop controller, for adjusting the acutal current i to said sliding current control value i*.

Attention should be given to preferred embodiments generating the sliding control value i* ("variable reference value") as integral of a "slide reference value" di*/dt, representing the sliding rate ("rate of rise of reference value i*"), wherein said sliding rate itself is taken from a closed loop control according to a desired value ("reference rate or rise") di*/dt. In this case the "slide reference value" di*/dt acts also as actual input signal of the closed loop controller.

SUMMARY OF THE INVENTION

Briefly stated, in accordance with one aspect of the invention, the aforementioned objects are achieved by providing an apparatus controlling the operation of an intermediate circuit current converter which has an intermediate circuit current. The intermediate circuit current can preferably be impressed by a control element. A rate of change limiter fed by a current control value adjusts a sliding current control value, for an intermediate circuit current in which the rate of change of the rate of change limiter determines the "sliding rate", i.e. the rate of rise of the sliding current control value. Sliding rate adjusting means controls the rate of rise of the rate of change limiter having as inputs operation parameters of the converter.

In accordance with another aspect of the invention, the aforementioned objects are achieved by providing a method for operating an intermediate circuit of a converter with an impressed sliding intermediate circuit current for which a maximum sliding rate is given to limit its rate of rise in case of an abrupt change of a current control value. The improvement consists of determining said maximum value dynamically corresponding to operation conditions, i.e. the limiting value is determined from time dependent actual parameters of the converter operation.

In accordance with a third aspect of the invention, the rate of rise of the actual (measured) intermediate current of an intermediate circuit of a converter is limited not by measuring actual values which could be used for determining a limiting value of a current controlling quantity, but by impressing the intermediate circuit current in accordance with a sliding current control value. The slide rate of this value is defined by or at least limited to a maximum value which is determined by control values such as commands, settings of their derivatives. These values depict a desired state of operation almost equal to the actual state.

In particular, the product of the converted frequency or an equivalent value and a representation value for the intermediate circuit current or output current amplitude of the inverter can be preset as a maximum value for the current rate of rise in order to assure that the initially mentioned inequality is always met.

This product can further be used as the desired value of a rate of rise control which always acts if the actual value i of the current changes at a rate exceeding said desired value of the rate of rise. Such a control then impacts on the generation of the sliding current control value in such a fashion that the rate of rise di/dt (actual current) becomes equal to the desired value. In case of sudden changes of the initially given control values therefore the rate of rise of the sliding control value is determined in such a fashion by a control reflecting the operating condition that the rate of rise of the current actual value is always adjusted to the reference value of the rate of rise (in particular, thus always to the operation-dependent preset maximum value).

This method of control is significant in a current intermediate circuit since the intermediate circuit reactance coil in and of itself during control frequency converter operation would operate in such a fashion that the actual current i would only be able to follow at some lag time a control value i* for whose rate or rise (di*/dt) a desired value (di*/dt)* has been preset. Without special measures even a second order control system cannot generally compensate for this delay with sufficient rapidity to assure that di/dt=(di*/dt)*. This is, however, obtained by the rate or rise control in accordance with this invention, where the rate of rise di*/dt of the control value i* ("sliding rate") is preset dependent on the operating conditions.

As, however, this control acts on the variable rate of the reference value only during rapid current changes and thus during slow changes of the original reference variable does not impact on the normal current control, it controls the limit value of the current rate of rise ("current rise limitation control") and assures that the frequency converter in case of sudden variations in the original control variables would always adjust the amplitude of the intermediate circuit current or of the output current corresponding to the new "sliding" reference variables at the maximum permissible rate.

If one utilizes in general the actual current as the actual value in controlling the current rate of rise, the harmonic content of the intermediate circuit current or of the output current amplitude can lead to problems. Thus, in order to adjust the rate or rise of the intermediate circuit current as quickly and reliably as possible to a preset value, particularly to the permissible maximum value which is the product generated by the frequency and the current, or to another maximum value, this embodiment has incorporated as another appropriate or additional measure in accordance with this invention to derive the actual value of this current rise limitation control from the current reference values themselves. At the same time by a precontrol of the intermediate circuit current, the invention assures that the intermediate circuit current actual value follows the intermediate circuit current reference value with the least delay possible. For this control arrangement, therefore, a current rate of rise reference value is generated and compared to the rate of rise of the current reference value. The output signal of this control provides the rate of rise of the reference value itself so that the integral of this reference value rate of rise can be set for the frequency converter as the reference value for the intermediate circuit current.

The presetting of the product from the converter frequency and current as the maximum value for the current rate of rise and the control of the current rate of rise in accordance with a maximum permissible reference value can be linked together and linked to the measures described in German patent application No. 2,144,422 to regulate a frequency converter.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
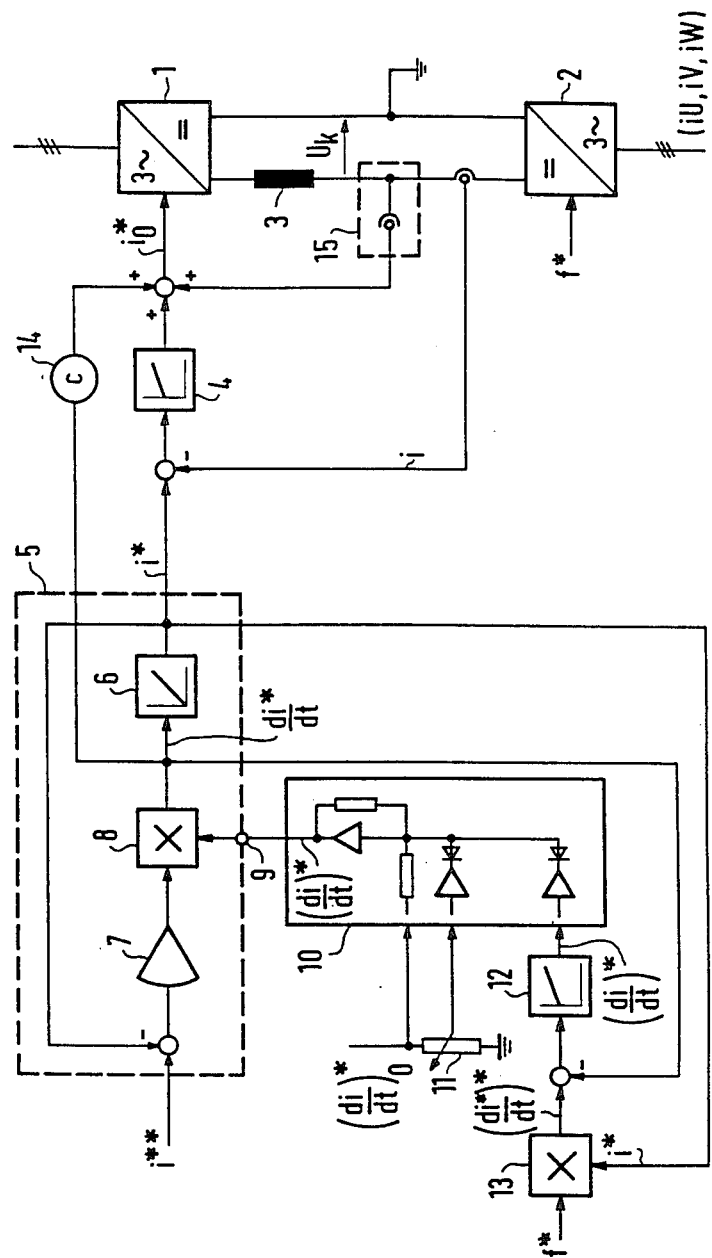
FIG. 1 shows a schematic diagram of a frequency converter three-phase system with control derived from the intermediate current according to the invention.

In FIG. 1 a controllable rectifier is designated by 1, and an inverter by 2 whose d.c. voltage connections are interconnected by the intermediate circuit reactance coil 3. Initially, the assumption is made that the frequency and amplitude of the frequency converter comprising 1, 2 and 3 can be regulated completely independently so that the converter frequency is preset by a frequency reference variable f* for inverter 2, while the intermediate circuit current (or the magnitude of the output current) is regulated by a current control variable generated by current regulator 4 and acting on rectifier 1. The actual value of current regulator 4, which can be obtained from the intermediate circuit current or via a rectifier from the input or output lines of the converter, is designated by i, while the symbol i* is chosen to designate the corresponding reference value.

In steady-state condition the current reference value i* should be equal to a reference variable i. However, a rate of change limiter 5 assures that in case of a variation of i, the current set value i* will move to the new value of i** in a smooth fashion, i.e., at a preset rate of rise (di*/dt)*, wherein due to the reference rate or rise (di*/dt)* the rate of rise itself (di/dt) is also set. In the case where current controller 4 acts without distortion on the intermediate circuit current, the rate of rise (di*/dt) of reference value i* is also equal to the rate or rise (di/dt) of the intermediate circuit current itself, wherein the limitation of (di/dt) is required by the necessity of the converter for commutatibility.

The rate of change limiter 5 includes at its output for i* an integrator 6, whose input signal thus defines the reference value rate of rise di*/dt. The difference between the reference value i* to be preset in a variable fashion and the reference variable i is conducted to an amplifier 7 which has a very high amplification capacity and thus already at the very low values of i - i* hits the limit. Its output signal thus does not attain any value between 0 and +1 and is multiplied in a multiplier 8 by the value (di/dt)* to determine the rate of rise of intermediate circuit current i. The output signal of this multiplier 8 is thus the rate of rise di*/dt of the current reference value and is preset by this invention in accordance with the operating conditions at terminal 9.

For this presetting of (di/dt)* in accordance with the operating conditions, FIG. 1 incorporates a minimum circuit 10 shown as a diode circuit which connects to terminal 9 the variable (di/dt)* prevailing at a corresponding input only if this variable is smaller than a limit (di/dt)$_0$* set at the potentiometer 11. This value (di/dt)$_0$* is set so that it assures the continued commutatibility of the converter even when operating at the highest converter frequency and highest converter output current.

In operating conditions in which the intermediate circuit current i or the converter output frequency f at that point in time do not attain the maximum value to which the constant (di/dt)$_0$* is set, a rate of rise limitation controller 12 provides the value (di/dt)* which via multiplier 8 is connected as the integration time constant to integrator 6 and thus leads to set value i*=∫(-di*/dt). dt as long as the inequality between i* and i** prevails.

Controller 12 receives its reference value proportional to the product of the frequency and current amplitude, wherein it is advantageous if for the frequency the corresponding frequency reference value f* and for the current amplitude the reference value i* itself are utilized.

Said operating-dependent reference value C·f*·i* is supplied as a maximum permissible reference value (di*/dt)* by a multiplier 13 and thus determines the reference value for the rate of rise di*/dt of the current reference value i*, which in turn determines the rate of rise of the intermediate circuit current i itself. This maximum reference value, e.g., (di*/dt)* in fact indicating the rate of rise (di*/dt) of reference value i*, is achieved by the fact that the input signal of integrator 6 is connected to controller 12 as the substitute actual value for the actual current rate of rise di/dt.

A special embodiment of the current control now assures that the increase of the reference value i*, limited to the maximum value (di/dt)*, also results in a corresponding limitation of the rate of rise of the current actual value i. As has been already explained in conjunction with U.S. Pat. No. 3,805,135, this occurs by having two voltages connected to the output signal of current controller 4 which are always noted by rectifier 1 as interference: namely the voltage U$_k$ which is determined at the inverter-side connection of coil 3 by the action of the inverter and the counter-voltage of the serially attached load as well as the voltage driving the intermediate circuit current through coil 3.

In and of themselves said voltages result in the fact that the intermediate circuit current actual value i can only follow the corresponding set value i* after a lag time. Connecting the corresponding precontrol signals, however, compensates for this lag. In place of the voltage drop at reactance coil 3 which drives the intermediate circuit current, it is advantageous to use the time derivative of the reference value i* which is proportional thereto as the precontrol signal. Said precontrol signal is derived directly at the input of integrator 6 over a proportional element 14. Similarly in accordance with U.S. Pat. No. 3,805,135 it is possible to use, instead of the voltage detecting circuit 15 for the inverter-side connecting voltage U$_k$ of reactance coil 3, a computation circuit which calculates the voltage U$_k$ from other reference variables, e.g., those arising when generating the values f* and i**.

Figure 2:
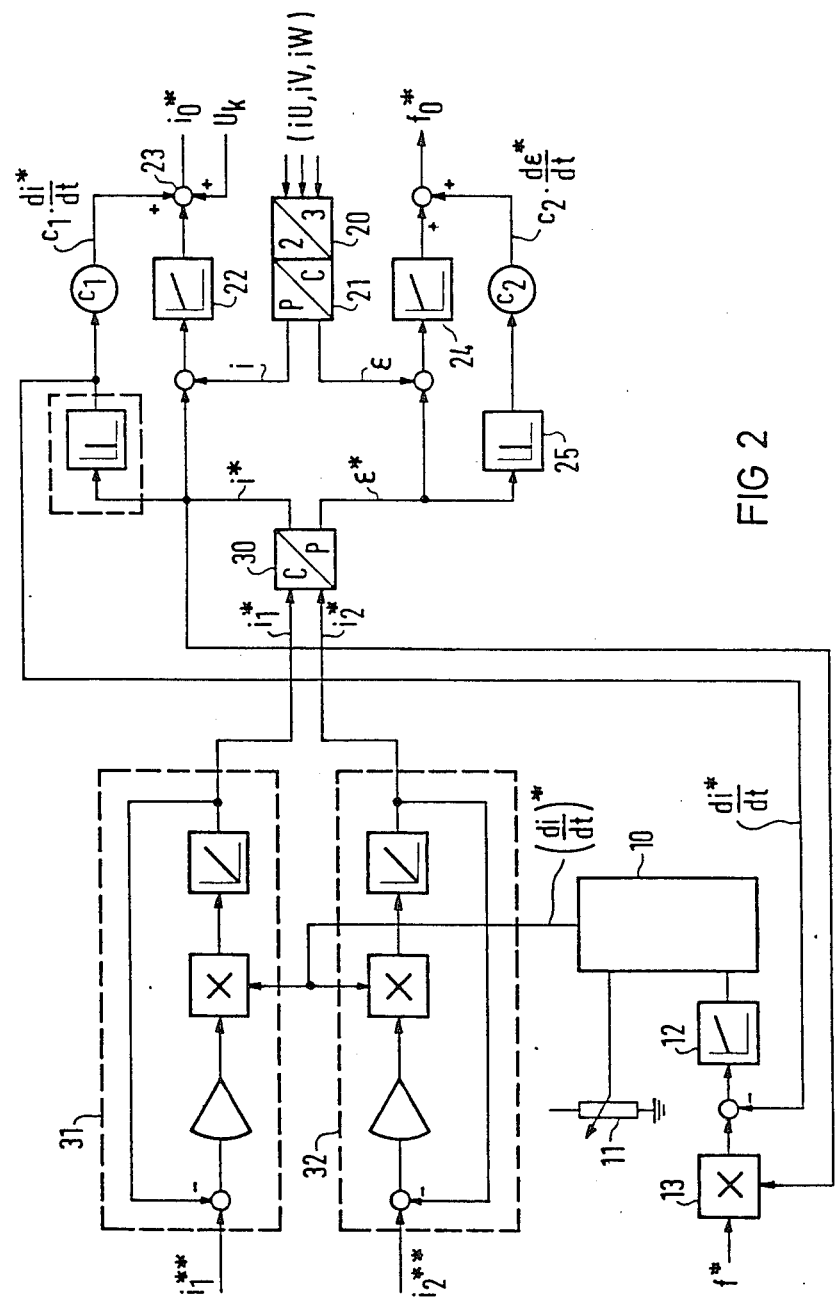
FIG. 2 shows a schematic diagram of control derived from the three-phase outputs of a frequency converter three-phase system according to the invention

In the embodiment shown in FIG. 2 measured value i of the intermediate circuit to be limited is not derived at the intermediate circuit itself, but at output U, V, and W of inverter 2, wherein the corresponding phase currents iU, iV, iW are recalculated by a ⅔ converter 20 into the two Cartesian components of a corresponding current vector, from which then a polar/Cartesian operating converter 21 determines the amplitude (magnitude i of current vector) and the phase (direction (ε) of the current vector). The actual current vector corresponding to the measured values iU, iV, iW is now adjusted by a control arrangement to a current reference vector which is determind by a reference magnitude /i*/ and a reference direction δ*.

In order for this current control to also operate without any delay, the design assures that the signal i$_0$* regulating rectifier 1 is generated from the output signal of a magnitude generator 22. In accordance with FIG. 1, on the one hand, variable C$_1$·(di*/dt) which, for example, can be calculated from reference value i* by differentiation or without a differentiator in a fashion specified in U.S. Pat. No. 3,805,135 from other variables obtained when generating the reference value, and on the other hand also the corresponding precontrol signal U$_k$ are connected to the magnitude controller output signal at the addition point 23.

For the control variable f$_0$* acting on inverter 2 which determines the frequency of the inverter and leads the current actual vector to follow along with the current reference vector in terms of its direction or phase, the design incorporates a phase controller 24 whose output signal is connected to the corresponding pilot regulated variable c2·dε*/dt derived from angle ε*. If the direction angle ε* is not preset directly, but rather as the angle functional pair cosine ε*, sine ε* as embodied in U.S. Pat. No. 3,805,135, then this second precontrol signal can also be generated without the use of a differentiator 25.

Controllers 22 and 24 thus receive as actual values a vector defined by magnitude /i/ and phase ε and as a reference value a reference vector defined by magnitude /i*/ and phase ε* whose vector difference is compensated for. Connecting the precontrol variable di*/dt and dε*/dt signifies therein that the vector generated from the control deviation is practically preset by the derivation of the reference current vector. Whether said precontrol is compensating for the vector difference in polar coordinates is undertaken in accordance with FIG. 2 or whether it is performed by having the orthogonal (i.e., Cartesian) component of the vectors compensated for makes no difference in this context.

What is of greater significance is that the current reference vector is preset by two variable reference values i1* and i2*, wherein i1* is the reference value for the one component (which in case of a field-oriented inductance machine is the field-parallel component designated as the "magnetizing current") and i2* the reference value for the other orthogonal component (the field normal "active current"), wherein then, if necessary, a C/p converter 30 generates magnitude /i*/ and phase ε* of the corresponding reference vector from said orthogonal components.

For each of these reference values i1* and i2* there is a corresponding adjusted control variable i1 and i2 which are transformed by the corresponding rate of change limiters 31 and 32 into the variable reference values i1* and i2*. Each of these rate of change limiters is designed in the same way as rate of change limiter 5 of FIG. 1, but the rate change (di*/dt) is jointly preset for both. To preset the rate change, the minimum circuit 10 is again used having on the one hand the potentiometer 11 to preset $(di/dt)_0^*$ as well as the rate of rise limitation controller 12 connected to it. The reference value $(di^*/dt)_0$ for the rate of rise of the reference value i* is generated using the multiplier 13 from the converter output frequency f* or a corresponding control variable as well as the magnitude of reference value i* itself. The differential di*/dt of the magnitude of reference value is advantageously utilized as the actual value for the rate of rise limitation controller 12 (as in FIG. 1), which in this case is derived as the output of the differentiation stage.

Using this invention it is thus possible to adjust the output current of the converter while simultaneously maintaining its commutatibility always at the maximum permissible speed in accordance with the respective operating condition.

If at a nearly constant reference variable i** there is a nearly constant current actual value i, then also the amplifier 7 of the rate of change limiter does not contact the limit while the limiting controller 12 seeks to level the reference value current rise di*/dt=0 to the reference value (di*/dt)* and thus itself contacts with the positive limit and thereby holds itself out of action due to the selector circuit 10. The time constant of the integrator 6 in this case is set by the preset value at potentiometer 11. As current decreases, i.e. di*/dt<0, this condition remains in effect even if:

$$/(di^*/dt)^*/ \leq /(DI^*/dt)/.$$

Thus, only in the case of a current rise, but not in the case of a current drop, is the rate limited, which could certainly be desirable in some cases; however, this rise only operation can be changed to a rise and drop rate limiter by a rectifier (absolute value function generator 30 in FIG. 3 or 4) in the actual value channel of the limiting controller 12.

Figure 3:
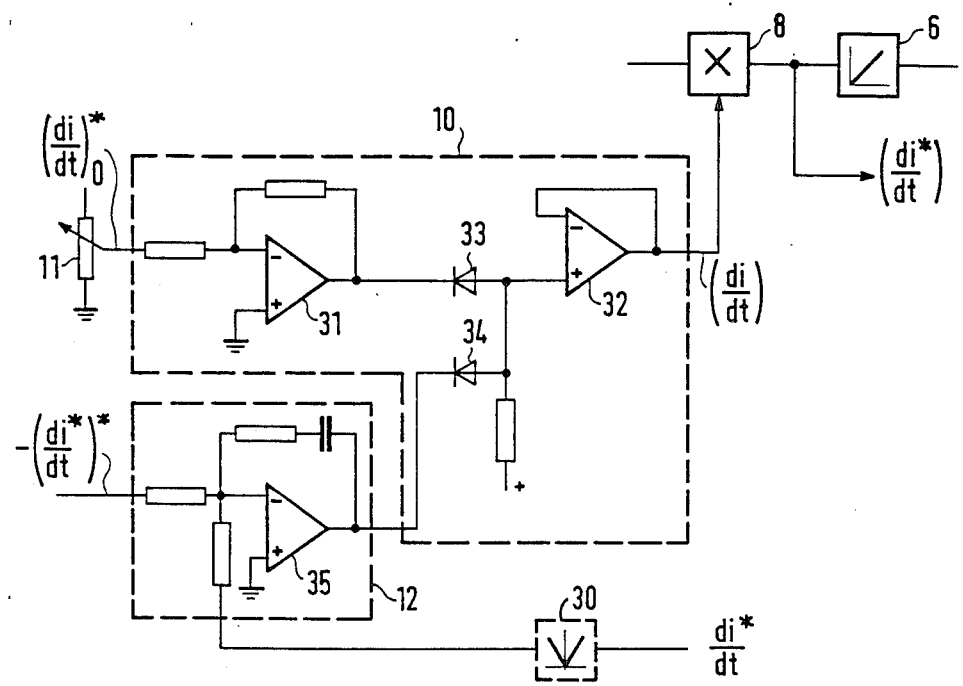
FIG. 3 shows a more detailed schematic diagram of one realization for control circuits 10 and 12 from FIGS. 1 or 2.
Figure 4:
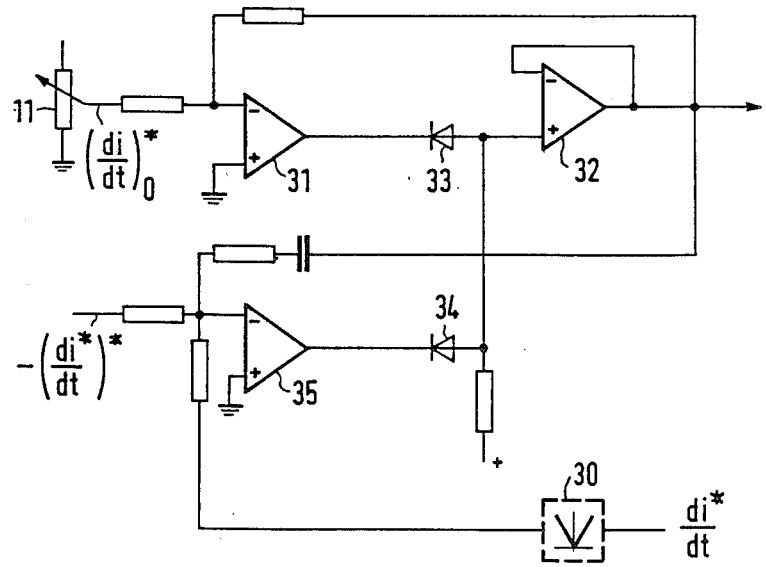
FIG. 4 shows a preferred detailed schematic of control circuit 10 and proportional integrator 12 from FIGS. 1 or 2.

In a standard selector circuit with amplifiers 31 and 32, diodes 33 and 34 in conjuction with an amplifier 35 wired as a proportional Integrator controller 12 in accordance with FIG. 3, it is, however, a disadvantage that the controller 35 disconnected by diode 34 first has to return to its working point after a renewed current rise appears, which indicates a dead time for the limiting controller. Therefore, as FIG. 4 shows, the design connects the output routed over diode 33 of the operating amplifier 31 used to preset the constant value $(di/dt)^*_0$ and the output conducted over diode 34 of the operating amplifier 35 used for the limiting controller and obtains the feedback of these operational amplifiers at this common connection node (or the inverting series amplifier 32). As long as diode 34 is blocked and holds controller 12 out of action, amplifier 35 is open and with its high amplification factor rapidly adjusts to a polarity change of its input variable, which equals:

$$-(di^*/dt)^* + di^*/dt,$$

in order, if necessary, to actuate controller 12 rapidly.

It will now be understood that there has been disclosed an improved method and apparatus to operate an intermediate circuit frequency converter. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A method for operating an indirect frequency converter with a d.c. intermediate current circuit, comprising the steps of:
   impressing a sliding intermediate circuit current in the intermediate current circuit in accordance with a current control value;
   determining a maximum value of said sliding intermediate current dynamically from operation parameters of said converter; and
   limiting the rate of rise of said sliding intermediate current to said maximum value.

2. A method according to claim 1, comprising the steps of
   determining the maximum value from control values for the converter operation,
   generating a sliding current control value, which increases, in case of increasing current control value, with said maximum value, until it reaches the current control value, and
   adjusting the sliding intermediate circuit current to said sliding current control value.

3. A method according to claim 1, comprising the steps of
   determining the product of two values representing converter frequency and said intermediate circuit current, respectively and
   limiting the rate of rise of the intermediate circuit current to said product, said product representing the maximum value.

4. A method according to claim 3, comprising the step of adjusting the rate of rise of said intermediate circuit current to said maximum value by use of closed loop control, in case of increasing current control value.

5. A method according to claim 4, comprising the steps of
   generating a sliding current control value from the current control value, said sliding current control value increasing with a sliding rate in case of increasing current control value until it equals the current control value, and
   determining said sliding rate by the closed loop control, the sliding rate figuring as actual value depicting said rate or rise of the intermediate circuit current.

6. A method according to claim 1, comprising the steps of
   (a) generating a slide reference value from a control deviation of said slide reference value from a desired sliding rate value determined by said operation parameters,
   (b) generating a sliding current control value in accordance with said current control value, said sliding current control value in case of increasing current control value being adjusted to the integral of said slide reference value until it reaches the current control value, and
   (c) adjusting the intermediate circuit current to said sliding current control value by use of a closed loop control, the output signal of the closed loop controller being preset by a precontrol value in accordance to the intermediate circuit voltage.

7. A method according to claim 6, further comprising the step of defining said desired sliding rate value by multiplication of said sliding current control value and a frequency value representing a desired converter frequency.

8. A method to claim 6, further comprising the steps of
using a rectifier which is connected by an intermediate circuit reactance coil to an inverter for generating the intermediate circuit current,
generating said precontrol value from a value representing the d.c. voltage drop across said reactance coil—such as a measured voltage drop, or, preferably, the sliding rate or the time derivative of the sliding current control value—and/or a value representing the voltage at the inverter side of the reactance coil.

9. A method of claim 1, comprising the steps of
(a) determining a first and second current control component value representing each of the orthogonal components of a current control vector, the magnitude of said current control vector representing the current control value,
(b) generating a first and second sliding current contol component value, from said current control component values and a slide reference value, said sliding current control component values representing each of the orthogonal components of a sliding current control vector and having a sliding rate simultaneously determined by said slide reference value, in case of increasing current control component values,
(c) generating a sliding current control value and a sliding phase control value representing magnitude and direction of said sliding current control vector, respectively,
(d) generating said slide reference value from a control deviation of the rate of rise of said sliding currnet control value from a desired sliding rate value, said desired sliding rate value representing said maximum value and, preferably, defined by the product of a converter frequency signal and said sliding current control value, and
(e) adujusting the phase of the converter output current to the sliding phase control or the magnitude of the converter output current to the sliding current control value.

10. An apparatus to control the operation of an intermediate circuit current converter, comprising:
a control element to control the intermediate circuit current or the amplitude of the output current of the converter according to an input value of the control element;
a rate of change limiter having as an input a current control value, said rate of change limiter generating a sliding current control value for the input of the control element, said sliding current control value having only a limited rate of rise while the current control value is increasing until said sliding current control value reaches an increased current control value; and
means for adjusting said limited rate of rise of said sliding current control value as a function of operation parameters of said converter.

11. An apparatus according to claim 10, wherein said sliding current control value rate adjusting means is only fed by control values of said converter and/or values derived from said control values of said converter.

12. An apparatus according to claim 10, further comprising a selector circuit coupled to said rate of change limiter and said sliding rate adjusting means, said selector circuit adjusting the sliding rate from a constant preset value to a dynamic value, said dynamic value being a function of said operation parameters.

13. An apparatus according to claim 10, said sliding rate adjusting means comprising a rate of rise controller having as input variables the time derivative of the sliding current control value and a desired sliding rate value and generating a reference value, said reference value representing the sliding rate and being fed to the rate of change limiter.

14. An apparatus according to claim 13, comprising multiplicating means for a converter frequency signal and said sliding current control value to define said desired sliding rate value.

15. An apparatus according to claim 10, said rate of change limiter comprising an integrator triggered by the current control value and generating the sliding current control value, the integration parameter of said integrator being adjusted by said sliding rate adjusting means.

16. An apparatus according to claim 10, said control element comprising a current controller fed by the sliding current control value and a measured value representing the actual value of the intermediate circuit current or the output current of the converter connected to the intermediate circuit an output signal of said current controller being automatically preset by a first precontrolled signal proportional to the sliding rate or by a second precontrolled signal proportional to the intermediate circuit voltage or, preferably, by the sum of both precontrolled signals.

17. An apparatus according to claim 16, comprising
input means defining two current control component values representing each orthogonal component of a current control vector, the first current control component value being fed to said rate of change limiter for generating a first sliding current control component value representing a first orthogonal component of a sliding current control vector,
a further rate of change limiter fed by said input means for generating a second sliding current control component value from said second current control component value, said second sliding current control component value representing a second orthogonal component of said sliding current control vector, and said sliding rate adjusting means determining the sliding rate of both sliding current control component values, simultaneosnly,
component transformation means for generating a sliding phase control value, representing the direction of said sliding current control vector, and said sliding current control value, representing the magnitude of said sliding current control vector, from said first and second sliding current control component values,
a first summing element at the output of current controller for presetting its output signal,
a phase controller fed by the sliding phase control value and a measured value of the converter output current phase, and
a second summing element at the output of said phase controller, said summing element being fed by the time derivation of said sliding phase control value and adjusting the phase of the converter output current.

* * * * *